Figure 1:
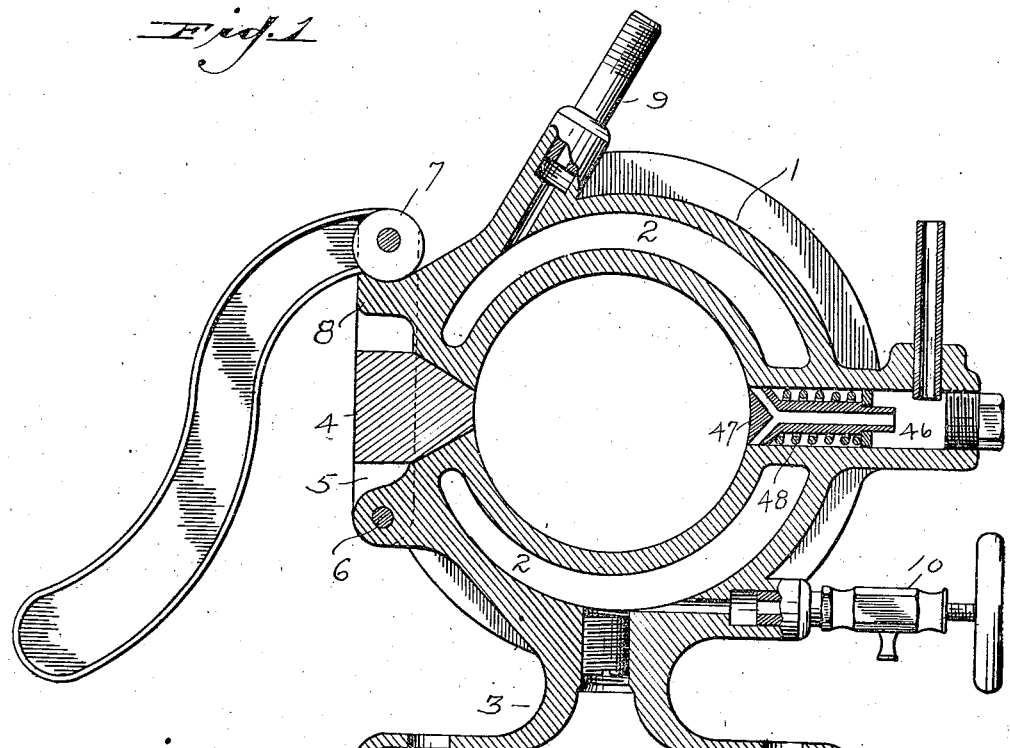

Feb. 8, 1927.

A. HUETTER 1,616,958

TUBE SPLICING DEVICE

Filed Feb. 19, 1923 3 Sheets-Sheet 1

Inventor
Andrew Huetter
By J. L. Walker
Attorney

Feb. 8, 1927.
A. HUETTER
1,616,958
TUBE SPLICING DEVICE
Filed Feb. 19, 1923      3 Sheets-Sheet 2
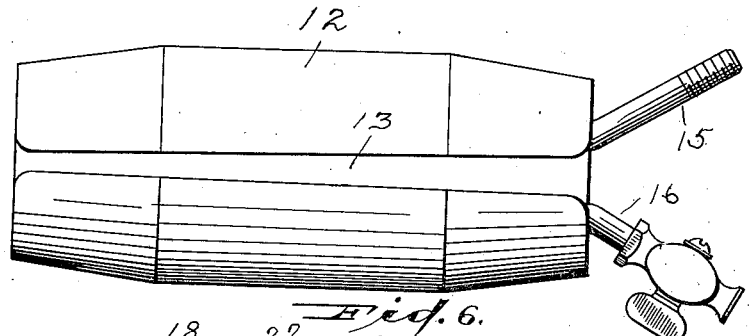
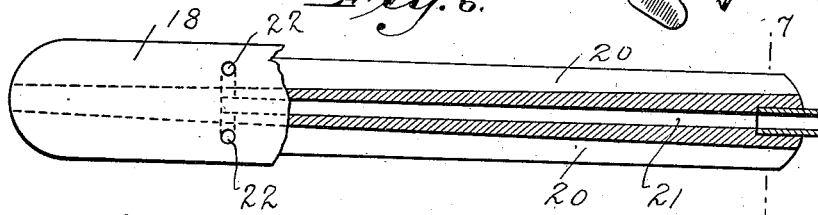
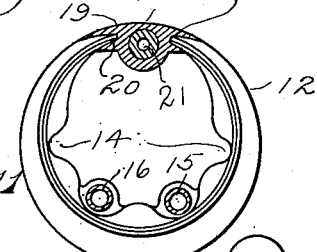
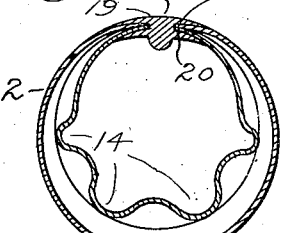
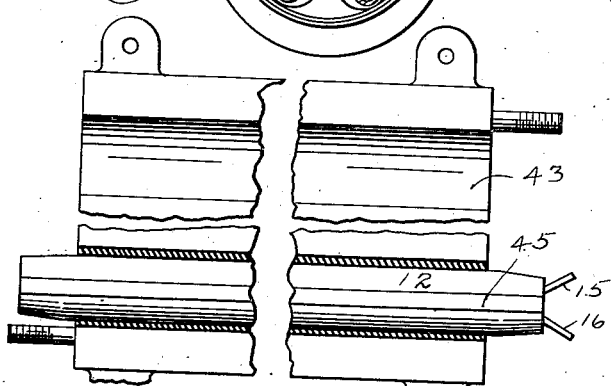
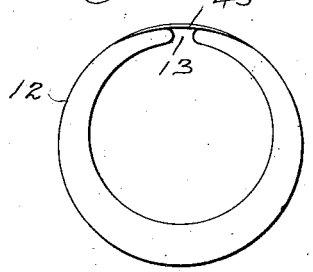
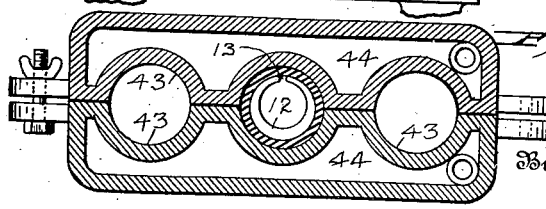
Inventor
Andrew Huetter
By J. L. Walker
Attorney

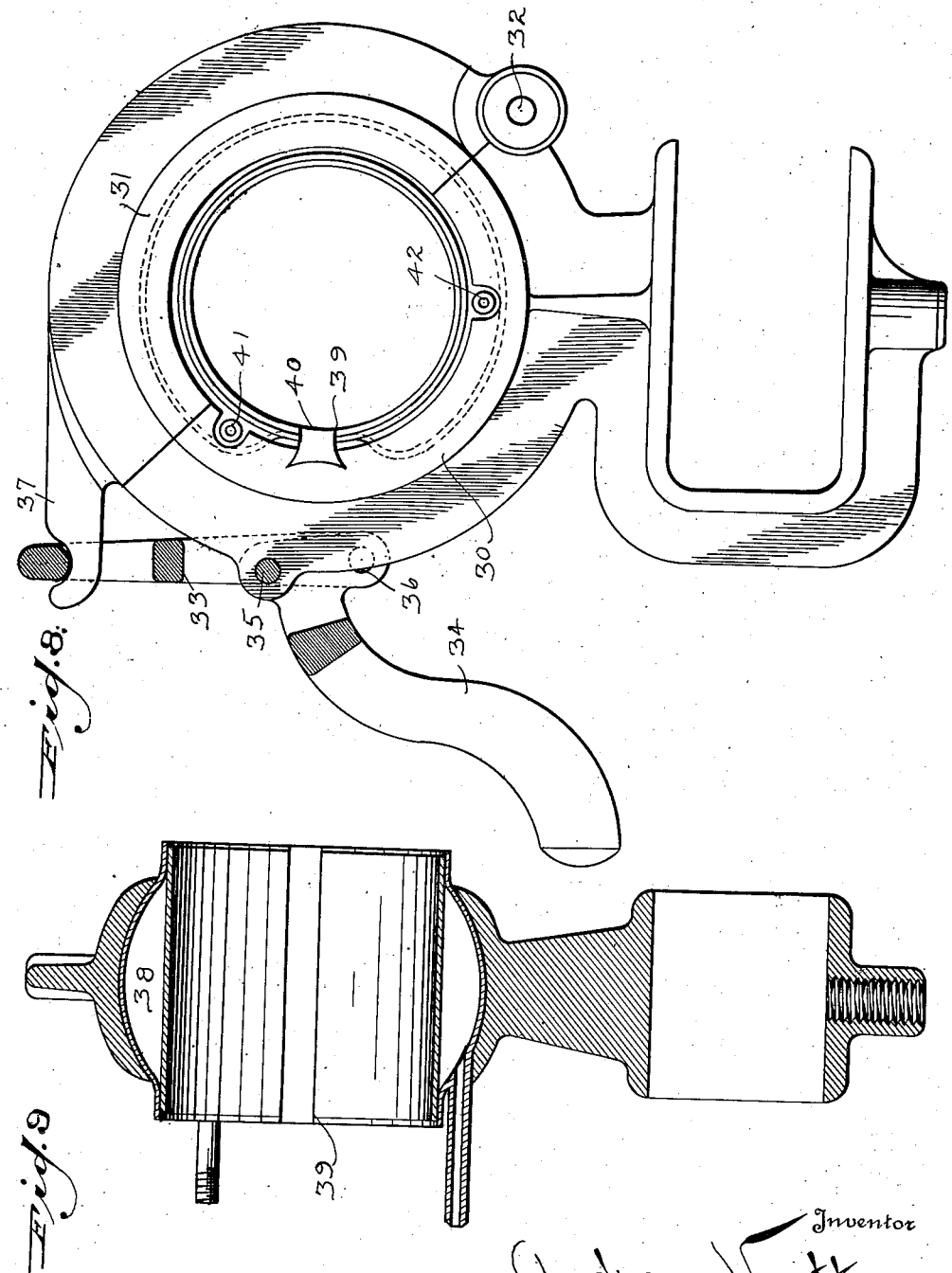

Patented Feb. 8, 1927.

1,616,958

UNITED STATES PATENT OFFICE.

ANDREW HUETTER, OF DAYTON, OHIO, ASSIGNOR OF FORTY-NINE ONE-HUNDREDTHS TO KURT ROEHLL AND TWENTY-FIVE ONE-HUNDREDTHS TO ELFRIEDE BETTY HUETTER, BOTH OF DAYTON, OHIO.

TUBE-SPLICING DEVICE.

Application filed February 19, 1923. Serial No. 619,890.

My invention relates to a tubular press, applicable in a small size to the splicing of rubber tubes, particularly inner tubes for use in automobile tire casings, but also adaptable in an extended form to the manufacture of rubber tubing and more particularly to rubber hose such as garden hose and analogous manufacture.

The invention contemplates an exterior form or matrix and an expansible mandrel of flexible, but inextensible material preferably sheet metal expanded by fluid pressure to subject the interposed tubular body to internal pressure. This internal pressure may be achieved by the use of super-heated steam thereby simultaneously affording the necessary vulcanizing heat as well as the pressure. For tube splicing both the matrix and the mandrel are longitudinally slotted, the mandrel being of substantially tubular form with hollow walls terminating in spaced relations to afford the access slot through which the endless tube may be removed after completion of the splicing or joining of the ends.

The object of the invention is to simplify the construction as well as the means and mode of operation of such tube forming and splicing devices whereby they will not only be cheapened in construction, but will be more efficient in use, uniform in operation, easily controlled and unlikely to get out of repair.

A further object of the invention is to provide for such tube forming or hose making presses or molds, and tube splicing presses, an expansible mandrel or core, which will readily withstand high degrees of temperature and will be quickly responsive to variations of internal pressure, enabling the pressure to which the product is subjected to be quite accurately gauged and changed at the will of the operator within a wide range of variation.

A further object of the invention is to provide a press or mold for tube splicing and forming operations, wherein the product will be subjected to both internal and external heat, thereby enabling the vulcanization to progress uniformly throughout the product without subjecting either the interior or exterior surface to excessive temperature.

A further object of the invention is to provide an external form or matrix for a tube splicing device, having an access slot therein for removal of the completed tube with an interlocking closure for such slot whereby such external form or matrix is enabled to withstand high internal pressure.

With the above primary and other incidental objects in view as will more fully appear in the specification, the invention consists of the features of construction, the parts and combinations thereof and the mode of operation or their equivalents as hereinafter described and set forth in the claims.

Figure 2:
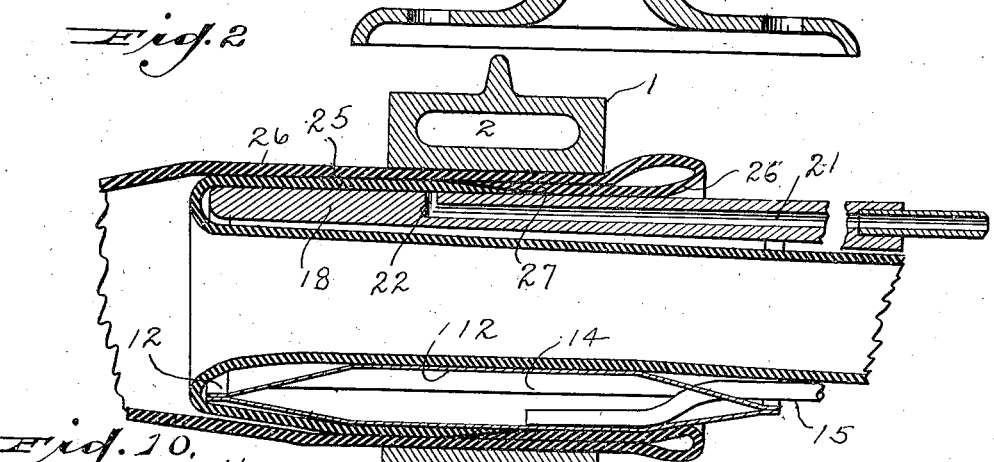
Figure 10:
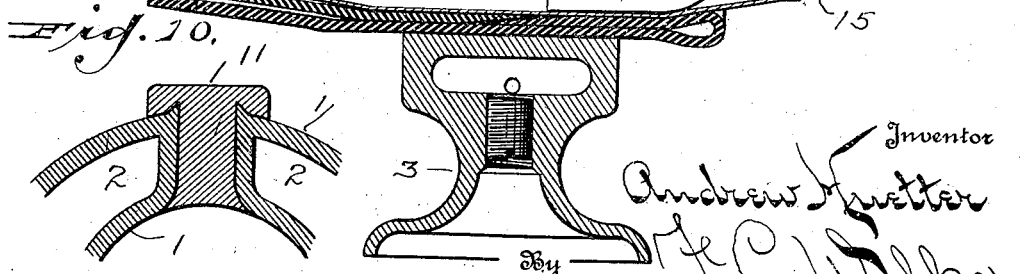

Referring to the drawings, Fig. 1 is a transverse sectional view and Fig. 2 a longitudinal or axial sectional view of a tube splicing press for joining the ends of an inner tube or the like, into an annulus. Fig. 3 is a side elevation of the expansible hollow walled mandrel by which internal expanding pressure is exerted upon the work. Fig. 4 is an end elevation of the expanding mandrel. Fig. 5 is a transverse sectional view of the mandrel. Fig. 6 is a plan view partly in section of the removable closure bar for the open side or slot of the mandrel. Fig. 7 is a transverse sectional view of this closure bar on line 7—7 of Fig. 6. Figs. 8 and 9 are respectively a side elevation and sectional view of a modified form of the press or matrix from which the expanding mandrel is omitted. Fig. 10 is a detail sectional view of a further modification of the slot closure means for the external ring or matrix. Figs. 11 and 12 are respectively a transverse sectional view and a plan view of a simplified form of matrix or press by which the expanding mandrel in elongated form is applied to the manufacture of tubes or hose. Fig. 13 is an end elevation of a simplified form of expanding mandrel.

Like parts are indicated by similar characters of references throughout the several views.

It is estimated that ninety-five per cent of the inner tire tubes are spliced by the well known cold cure or acid method, which is most generally used at the present time. This is due to the fact that the steam cure method or vulcanization processes as heretofore attempted are not economical in labor cost although more reliable is effect and eliminate all of the serious objections incident to the cold cure method. Not only is the present invention intended to overcome the objections to the cold cure or acid method of tube splicing, but it also enables a material saving in stock by effecting successful and complete splicing with approximately one half to one inch of overlap, whereas the cold cure process ordinarily necessitates an overlap of the tube ends of several inches in extent. The press herein described is further designed to increase the speed of operation over that of the cold process or acid cure, reducing losses due to lack of contact or leaky joints to minimum and by elimination of acid fumes a safe condition for employees is insured.

Referring to Figs. 1 and 2, 1 is the external press ring or matrix, having hollow walls to afford an interior steam space 2. The press ring or matrix is supported in any suitable manner as by the pedestal 3. The press ring or matrix is longitudinally slotted at either the side or the top as may be most convenient to facilitate the insertion and removal of the tube to be spliced. A closure member 4 is provided for this access slot, which closure member may be engaged with the press ring or matrix in any suitable manner preferably in such way as to reinforce the ring against expansion or spreading of the access opening. In the present instance the closure member 4 has been shown as provided with lugs or ears 5, pivoted at 6 to the press ring 1 at one side of the access opening, and provided with oppositely extending lugs or ears carrying latch means, in the present instance, an eccentric head 7, engaging a suitable shaped lug 8, projecting from the ring or matrix at the opposite side of the access opening. The closure member 4 accurately fits the access slot in the press ring with its inner edge or face coincident with the interior surface of the ring or press. By oscillation of the eccentric head 7 to disengage it from its coacting lug, the closure member 4 may be oscillated about its pivotal connection out of the slot or access opening to permit the insertion or removal of the tube. An inlet 9 is provided for admission of live steam to the chamber 2, and a similar connection is provided for the exhaust of said steam so that a circulation of super-heated steam may be maintained through the chamber 2 to afford an exterior vulcanizing heat. A drain cock 10 for water of condensation is provided which communicates with the bottom of the steam chamber 2.

In lieu of the oscillatory closure 4 for the press ring or matrix, there has been shown in Fig. 10 a longitudinally sliding closure bar 11 having interlocking engagement with the adjacent edges of the access slot. To this end as shown in Fig. 10, the margins of the access opening are provided with longitudinal beads or lips engaging in corresponding grooves in the sliding closure bar. This closure bar conforms to the shape of the access opening which in the present instance is flared inward. The bar thus has a dovetail engagement with the walls of the press ring or matrix in relation with which it is longitudinally slidable into and out of operative position.

For use within the ring press or matrix there is provided an independent but co-operating expansible mandrel 12 of flexible but inextensible material. This mandrel 12 is preferably though not necessarily constructed from sheet metal, such as sheet copper, or an alloy containing a considerable percentage of copper, but possessing a reasonable degree of tension or spring. This mandrel 12 is of a general tubular form and provided with double or hollow walls terminating circumferentially in spaced relation to afford a longitudinal slot 13, for the insertion and removal of the tube. This mandrel might be described as a sheet metal cylindrical formation having therein a reentrant tubular loop or plait of comparatively large dimension. The entrance to this tubular loop or plait forms the longitudinal slot 13, while the loop or plait forms the inner wall of the hollow walled mandrel. While in practice sheet copper or copper alloys have been found quite suitable for this purpose, other material having heat resistant properties and a reasonable degree of elasticity or flexibility, even though non-metallic may be equally desirable. The inner and outer walls of the mandrel are united at the extremities of the mandrel to form within the mandrel a sustantially crescent shaped steam chamber, the mandrel is preferably somewhat tapered adjacent to its end, which not only facilitates the joining of the inner and outer walls, but also facilitates its introduction into the end of the tube to be joined, or spliced. To increase the expansive capability of the mandrel the interior wall is longitudinally corrugated as at 14. Steam inlet and outlet conduits 15 and 16 are provided for circulating live steam within the hollow walls of the mandrel for the double purpose of subjecting the tube being spliced to internal vulcanizing heat and for expanding the mandrel to subject the overlapping ends of the tube to internal expanding pressure during the vulcanizing operation. The slot 13 formed by the separation of the margins of the hollow walls of the mandrel to afford access to the interior thereof for the introduction and removal of the tube is somewhat tapered or converging in a longitudinal direction. A sliding closure bar 18 is provided, the exterior face 19 of which is arcuate and concentric with the exterior face of the mandrel and the interior of the ring or matrix. This sliding closure bar 18 is provided with marginal grooves or recesses 20, within which project the margins of the access slot 13, of the double walled mandrel. These marginal grooves 20 in the sliding closure bar converge in conformity with the taper of the slot 13 and the bar therefor affords a wedging action as it is advanced into the tapered slot. The closure bar 18 is provided with a longitudinally disposed passage or bore 21, from which extend vent openings 22 for the discharge of air under pressure to initially strip the tube from the mandrel as will be hereinafter described. The margins of the double walls of the mandrel fit loosely in the marginal grooves or recesses 20, whereby under the influence of internal pressure the mandrel may expand. The admission of steam under pressure to the interior of the hollow walls of such mandrel tends to straighten the arcuate walls or distend the mandrel radially by extending or widening the access slot 13. The longitudinal corrugations 14 in the interior wall of the hollow mandrel compensate for such radial deflection of the outer or concentric wall.

When in use, one end of the tube to be spliced is passed longitudinally through the central opening of the mandrel and the open end of the tube is reversed or turned backward over the exterior of the mandrel as shown at 25 in Figure 2. It will be understood that at this time the closure bar 18 is inserted within the slot 13 of the mandrel, so that the mandrel presents a continuous cylindrical surface. The opposite end of the tube is then drawn over the mandrel and reversed portion of the tube as shown at 26. The extremity of this outer tube layer is inturned into overlapping relation with the first end of the tube as shown at 27. These overlapping parts having first been roughened and coated with vulcanizing compound, the assembled tube and mandrel are placed within the press ring or matrix 1 by passing a portion of the tube through the access slot and then shifting the tube to bring the mandrel and overlapping portion of the tube within the ring. The closure member 4 having been adjusted, the bar 18 of the mandrel is adjusted longitudinally to initially expand the mandrel by its wedging action to insure firm seating or clamping of the overlapping portion of the tube, between the exterior of the mandrel and the interior of the press ring or matrix. The adjustment of the parts having been made, steam is admitted to the chamber 2 of the ring or matrix 1 and also to the interior of the hollow walls of the mandrel. The steam within the chamber 2 serves to heat the ring or matrix to subject the enclosed portion of the tube to external vulcanizing heat. The admission of steam to the interior of the flexible expansible hollow walled mandrel not only affords internal vulcanizing heat to the overlapped tube portion, but also serves to expand the mandrel thereby subjecting the overlapped tube ends to internal expanding pressure simultaneously with the application of vulcanizing heat.

In lieu of the mode of overlapping the tube ends as shown in Fig. 2 and described above, a preferred method would be to reverse the initial tube end upon itself after having been turned backward upon the exterior of the mandrel. That is to say, the initial end of the tube being passed through the mandrel is turned inside out over the end of the mandrel and about its exterior and the end of the tube is again reversed upon itself outwardly so that the initial end of the tube will afford a double layer about the exterior of the mandrel, the opposite end of the tube is then drawn over this reverse initial tube extremity into overlapping relation with the reverse end, which brings the overlap or joint exteriorly of the assembly where it may be easily observed and adjusted. In such operation the overlap or joint will be in contact with the wall of the press ring or matrix 1, and not in contact with the wall of the mandrel as shown in Fig. 2. However, as the mode of assembling the tube is immaterial and in itself forms no part of the invention either method may be used. The vulcanization of the overlap or joint having been completed the steam pressure is released from the interior of the hollow mandrel, which permits the mandrel to contract. The mandrel is then withdrawn from the ring 1, and the tube extended to remove the infold or plait. The endless tube or annulus will then be found to extend through the hollow mandrel and also through the ring or matrix 1. By removing the closure slide 18 from the mandrel the tube may be disengaged by drawing it laterally through the access slot 13. It is in like manner removed from the ring or matrix 1 by disengaging the closure member 4 and removing the tube laterally through the access slot.

In Figs. 8 and 9 there is shown a modification of the outer member or matrix. In this construction the press ring or matrix is formed in two halves 30 and 31, hinged one to the other at 32 and locked in their closed position by any suitable latching means, as the lever actuated link 33. In this case the operating lever 34 is pivoted at 35 to the ring members 30 and pivoted at 36 to the link 33. The link 33 engages over a finger or lug 37 upon the second ring member 31.

By oscillation of the lever the connection 36 is moved past dead center relation with the pivotal point 35 thereby holding the ring members in their closed relation.

In lieu of forming the steam chamber 2 within the main body of the ring or matrix there is provided a separable hollow walled split ring or steam chamber 38, the walls of which may be of sheet metal and hence comparatively thin and capable of transmitting a higher degree of heat than the thick wall shown in Figs. 1 and 2. This hollow walled ring or removable steam chamber 38 is broken or provided with an access slot 39, through which the tube may be introduced or removed. The inner periphery of the ring members 30 and 31 is concaved or recessed to receive the hollow ring or steam chamber 38, the member 30 being provided with a longitudinally disposed inwardly extending tongue or bead 40, which extends within the access slot 39 of the ring 38. The inner face of this tongue or bead 40 agrees with the inner circumference of the steam chamber 38. This hollow walled ring or steam chamber 38 is provided with steam inlet and outlet conduits 41 and 42, by which live steam is circulated therethrough to afford exterior vulcanizing heat. The hollow mandrel illustrated in Figs. 3, 4 and 5 with its sliding closure bar shown in Fig. 6 is employed in conjunction with the structure shown in Figs. 8 and 9 in the same manner heretofore described.

In the manufacture of rubber tubing, rubber hose and the like, it is the practice to form such tubing in lengths of considerable extent by constructing the tube or hose about a "pole" which in most instances is merely a length of metallic tubing or pipe which forms a core or mandrel. While the expansible mandrel shown in Fig. 3 is illustrated as of comparatively short length to adapt it to the splicing matrix shown in Figs. 1, 2, 8 and 9, it is to be understood that the expanding mandrel may be made in units of great length to be employed as a core or mandrel for the manufacture of rubber tubing or rubber hose. In such use of this hollow expansible mandrel a matrix may be employed formed in two halves, each half having therein one or more straight semi-circular grooves or depressions as shown at 43, Figs. 11 and 12. These molds containing the groove 43 may be formed hollow or provided with steam chambers 44 for the circulation of live steam to afford external vulcanizing heat. The tubes or hose built about hollow expansible mandrels such as shown in Fig. 3 and heretofore described, but of considerable length as indicated in Fig. 12 are enclosed within the registering grooved recesses 43 of the respective mold member, and by the admission of live steam to the interior of the hollow walls of such extended hollow mandrel, the mandrels are expanded to subject the tubes or hose section to internal expanding pressure as well as to internal vulcanizing heat. Since such tubes or hose would be formed in continuous lengths open at their end, and not an annulus as is the case with the joined tube before referred to, such tube or hose can be withdrawn longitudinally from the expansible mandrel or core upon the release of the steam pressure. Not being necessary to remove the tube through the slot and the slot functioning only to permit the expansive adjustment of the mandrel under influence of internal steam pressure, the adjustable closure bar 18 may if desired be entirely omitted, and the slot closed by a closure plate or fin 45 secured to one of the marginal edges of the mandrel and overlapping the opposite end loosely, so that while the slot will be closed and the fin will present a continuous surface, the margins of such slot will be capable of relative adjustment to and from each other beneath the overlapping fin.

When the longitudinally adjustable closure bar 18 is employed in the expanding mandrel, air under pressure may be admitted through the conduit 21 and discharged through the vent opening 22 beneath the overlapping or enclosing portion of the tube to facilitate its separation from the mandrel. Likewise there may be provided in the ring 1, an auxiliary air supply chamber 46, having therein a nozzle member 47, projected inwardly against the spring 48 by air pressure admitted to such auxiliary chamber and serving to discharge air intermediate the enclosed tube and the ring to initially separate the ring and tube to permit the ready removal of the latter at the completion of the vulcanizing operation. While this auxiliary air supply means for delivering air under pressure intermediate the tube and the ring and also intermediate the tube and the mandrel is desirable and facilitates the removal of the tube, it is to be understood that these features are non-essential and may be wholly omitted without interfering with the operation or function of the apparatus.

While the apparatus hereinbefore described is primarily intended for joining or splicing tubes by heat or vulcanization it is to be understood that the same apparatus will prove very desirable and successful in carrying out the cold or acid splicing operation by subjecting the splice or overlap to internal expanding pressure, which in such instance may be supplied by the admission of air under pressure to the hollow walls of the expansible mandrel. In lieu of steam heat, the mandrel and press may be electrically heated. The contraction of the mandrel upon the release of the internal pressure facilitates its removal from the tube whether employed for splicing purposes or in the manufacture of long lengths of tubing or hose.

Cross reference is made to my Patent No. 1,581,448 granted April 20, 1926.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is therefore claimed in any of its forms or modifications within the legitimate and valid scope of the appended claims.

Having thus described my invention, I claim:

1. In an apparatus of the character described, a mandrel, and an exterior form sleeve surrounding the mandrel and enclosing a body of material surrounding the mandrel, said exterior form sleeve being longitudinally slotted, a sliding closure for said slot and interlocking beads upon the closure slot and form sleeve whereby the opposite edges of the slot are interconnected, and means for relatively adjusting the mandrel and form sleeve to compress the interposed body of material.

2. In an apparatus of the character described, an exterior form member and a tubular mandrel therein having hollow metallic flexible walls, said mandrel having therein a longitudinally disposed slot, a removable closure for said mandrel slot and means for admitting heating medium under pressure to the interior of the hollow wall of the mandrel for relatively expanding the mandrel in relation with the exterior form member independent of said closure to compress an interposed body of material surrounding the mandrel within the form sleeve.

3. In an apparatus of the character described, an exterior form, and an expansible mandrel co-acting therewith to compress a body of material surrounding the mandrel within the exterior form, said mandrel comprising a tubular body of sheet metal having hollow walls, said hollow walled body being longitudinally split whereby the respective sides of the member are separable under the influence of internal pressure, removable closure for the longitudinal split affording a continuous surface for engagement of the body of material and means for applying internal pressure to expand the mandrel.

4. In an apparatus of the character described, an exterior form, and an expansible mandrel co-acting therewith to compress a body of material surrounding the mandrel within the exterior form, said mandrel comprising a shell of flexible but inextensible material and a longitudinally disposed reentrant loop of comparatively large size permitting deflection of the side walls of the shell under influence of internal pressure, a removable closure for the reentrant loop and means for applying internal pressure to effect expansion of the shell.

5. In an apparatus of the character described, an exterior form, and an expansible mandrel coacting therewith to compress a body of material surrounding the mandrel within the exterior form, said expansible mandrel being of tubular form and provided with a longitudinally disposed slot, a removable closure for said slot and fluid pressure means for expanding the mandrel.

6. In an apparatus of the character described, an exterior form, and an expansible mandrel co-acting therewith to compress a body of material surrounding the mandrel within the exterior form, said expansible mandrel being of substantially tubular form and having a longitudinally disposed slot whereby the edges of the slot are relatively adjustable to compensate for expansion and contraction, a guard member forming a closure for said slot but permitting the relative movement of the edges thereof and fluid pressure means for expanding said mandrel.

7. In an apparatus of the character described, an unyielding exterior form, and an expansible mandrel comprising a sheet metal structure having a hollow curved wall forming a fluid tight chamber, the edges of the hollow curved walls being free to move relative to each other, a removable closure bridging the space between such relatively movable edges and means for introducing a fluid under pressure into said chamber.

8. In an apparatus of the character described, an unyielding exterior form, and an expansible mandrel of tubular form open at its ends and having hollow walls, the longitudinal closed edges of which are arranged adjacent one to the other but capable of relative movement and a movable closure bridging the space between the adjacent edges, and means for introducing fluid under pressure into said hollow walls.

9. In an apparatus of the character described, an unyielding exterior form, and an expansible mandrel coacting therewith to compress a body of material surrounding the mandrel within the exterior form, said mandrel comprising a tubular structure open at its ends and having curved hollow walls forming fluid tight chambers, the adjacent edges of said walls being separated one from the other and relatively movable, and a guard strip overlapping the adjacent edges of the walls and forming a closure for the intervening space, and means for introducing fluid under pressure within said walls.

In testimony whereof, I have hereunto set my hand this 9th day of February, A. D. 1923.

ANDREW HUETTER.